United States Patent
Matsuno (10) Patent No.: US 9,936,179 B2
(45) Date of Patent: Apr. 3, 2018

(54) IMAGE PROJECTION APPARATUS AND METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Hiroyuki Matsuno, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/819,794

(22) Filed: Aug. 6, 2015

(65) Prior Publication Data

US 2016/0044289 A1    Feb. 11, 2016

(30) Foreign Application Priority Data

Aug. 8, 2014  (JP) .................................. 2014-162212
May 7, 2015   (JP) .................................. 2015-094667

(51) Int. Cl.
*H04N 9/31* (2006.01)
*G02B 13/16* (2006.01)
(Continued)

(52) U.S. Cl.
CPC ............ *H04N 9/317* (2013.01); *G02B 13/16* (2013.01); *G02B 15/15* (2013.01); *G03B 5/04* (2013.01);
(Continued)

(58) Field of Classification Search
CPC .. G03B 21/142; G03B 21/147; G03B 21/145; H04N 9/3188; H04N 9/3102; H04N 9/3185
See application file for complete search history.

(56) References Cited

U.S. PATENT DOCUMENTS 7,248,303 B2   7/2007  Iwaki
8,446,529 B2   5/2013  Yokoyama
(Continued)

FOREIGN PATENT DOCUMENTS

CN    1637584 A     7/2005
CN    101742128 A   6/2010
(Continued)

OTHER PUBLICATIONS

Search Report issued in counterpart application No. GB1513918.1, dated Feb. 4, 2016.
(Continued)

*Primary Examiner* — Christina Riddle
*Assistant Examiner* — Christopher Lamb, II
(74) *Attorney, Agent, or Firm* — Rossi, Kimms & McDowelll LLP (57) ABSTRACT

An image projection apparatus (1) is an image projection apparatus in which an optical axis of a projection lens (19) for projecting an image and a center position of an image formation area on a light modulation element (32) may be displaced relative to each other, and the image projection apparatus includes electronic zoom means (13) for magnifying or reducing a size of the image formation area on the light modulation element by electronic zooming centered at a predetermined position, and control means (14) for controlling the electronic zoom unit to perform the electronic zooming with the predetermined position as the optical axis.

20 Claims, 8 Drawing Sheets

(51) Int. Cl.
  *G02B 15/15* (2006.01)
  *G03B 21/14* (2006.01)
  *G03B 5/04* (2006.01)
(52) U.S. Cl.
  CPC ......... *G03B 21/142* (2013.01); *H04N 9/3102* (2013.01); *H04N 9/3188* (2013.01)

(56) References Cited

U.S. PATENT DOCUMENTS

| | | | |
|---|---|---|---|
| 8,794,768 B2 | 8/2014 | Ozawa | |
| 8,905,556 B2 | 12/2014 | Tsukagoshi | |
| 2005/0162624 A1 | 7/2005 | Miyasaka | |
| 2006/0227428 A1* | 10/2006 | Furui | H04N 9/3185 359/630 |
| 2011/0157487 A1* | 6/2011 | Akeyama | G03B 5/02 348/759 |
| 2011/0181846 A1* | 7/2011 | Ozawa | H04N 9/3185 353/70 |
| 2012/0218528 A1* | 8/2012 | Kano | G03B 21/142 353/101 |
| 2013/0107229 A1 | 5/2013 | Otani et al. | |

FOREIGN PATENT DOCUMENTS

| | | |
|---|---|---|
| EP | 1619889 A2 | 1/2006 |
| JP | 2005121689 A | 5/2005 |
| JP | 3722146 B1 | 11/2005 |
| JP | 2006287863 A | 10/2006 |
| JP | 2012108479 A | 6/2012 |
| JP | 2012128056 A | 7/2012 |

OTHER PUBLICATIONS

Office Action issued in Chinese Appln. No. 201510484275.1, mailed Nov. 2, 2016. English translation provided.

Office Action issued in Chinese Patent Application No. 201510484275.1 mailed Jul. 4, 2017. English translation provided.

* cited by examiner

IMAGE PROJECTION APPARATUS AND METHOD OF CONTROLLING THE SAME, AND NON-TRANSITORY COMPUTER-READABLE STORAGE MEDIUM

BACKGROUND OF THE INVENTION

Field of the Invention

The present invention relates to an image projection apparatus capable of performing electronic zooming.

Description of the Related Art

A liquid crystal projector (image projection apparatus) is an apparatus which modulates light beams emitted from a light source depending on image information to form an optical image and magnifies the optical image by using a projection lens to project the magnified image on a screen. When the image is to be projected on a large screen, the liquid crystal projector is mounted on a ceiling with some installation distance in many cases. When a rear projection is to be performed from a back of a screen, a wide-angle end focal lens is used.

Japanese Patent Laid-open No. 2012-128056 discloses a display apparatus which shifts a lens to align positions of the centers of images when receiving a zoom instruction. Japanese Patent No. 3722146 discloses a projector which deforms a projection area so that a circumference of a projection area contacts a circumference of a projection plane with at least one contact point by using a zoom processing unit of the projection image and a keystone correcting unit.

However, when the zooming is performed for the projection area by using a lens-interchangeable liquid crystal projector, a luminance of the projection image varies depending on a shift position of a lens. Therefore, in order to obtain a high-luminance projection image, it is necessary to perform appropriate zooming depending on the shift position of the lens. When a fixed focal lens is used, it is preferred that electronic zooming is performed, instead of optical zooming, to align angles of view in some cases.

SUMMARY OF THE INVENTION

The present invention provides an image projection apparatus, a method of controlling the image projection apparatus, and a non-transitory computer-readable storage medium which are capable of appropriately performing electronic zooming depending on lens information such as a shift position of a lens.

An image projection apparatus as one aspect of the present invention is an image projection apparatus in which an optical axis of a projection lens for projecting an image and a center position of an image formation area on a light modulation element may be displaced relative to each other, and the image projection apparatus includes an electronic zoom unit configured to magnify or reduce a size of the image formation area on the light modulation element by electronic zooming centered at a predetermined position, and a control unit configured to control the electronic zoom unit to perform the electronic zooming with the predetermined position as the optical axis.

A method as another aspect of the present invention is a method of controlling an image projection apparatus in which an optical axis of a projection lens for projecting an image and a center position of an image formation area on a light modulation element may be displaced relative to each other, and the method includes magnifying or reducing a size of the image formation area on the light modulation element by electronic zooming centered at a predetermined position, and performing the electronic zooming with the predetermined position as the optical axis.

A non-transitory computer-readable storage medium as another aspect of the present invention carries executable instructions which upon execution cause the method to be performed.

Further features and aspects of the present invention will become apparent from the following description of exemplary embodiments with reference to the attached drawings.

DESCRIPTION OF THE EMBODIMENTS

Embodiments of the present invention will be described below with reference to the accompanied drawings.

First Embodiment

Figure 1:
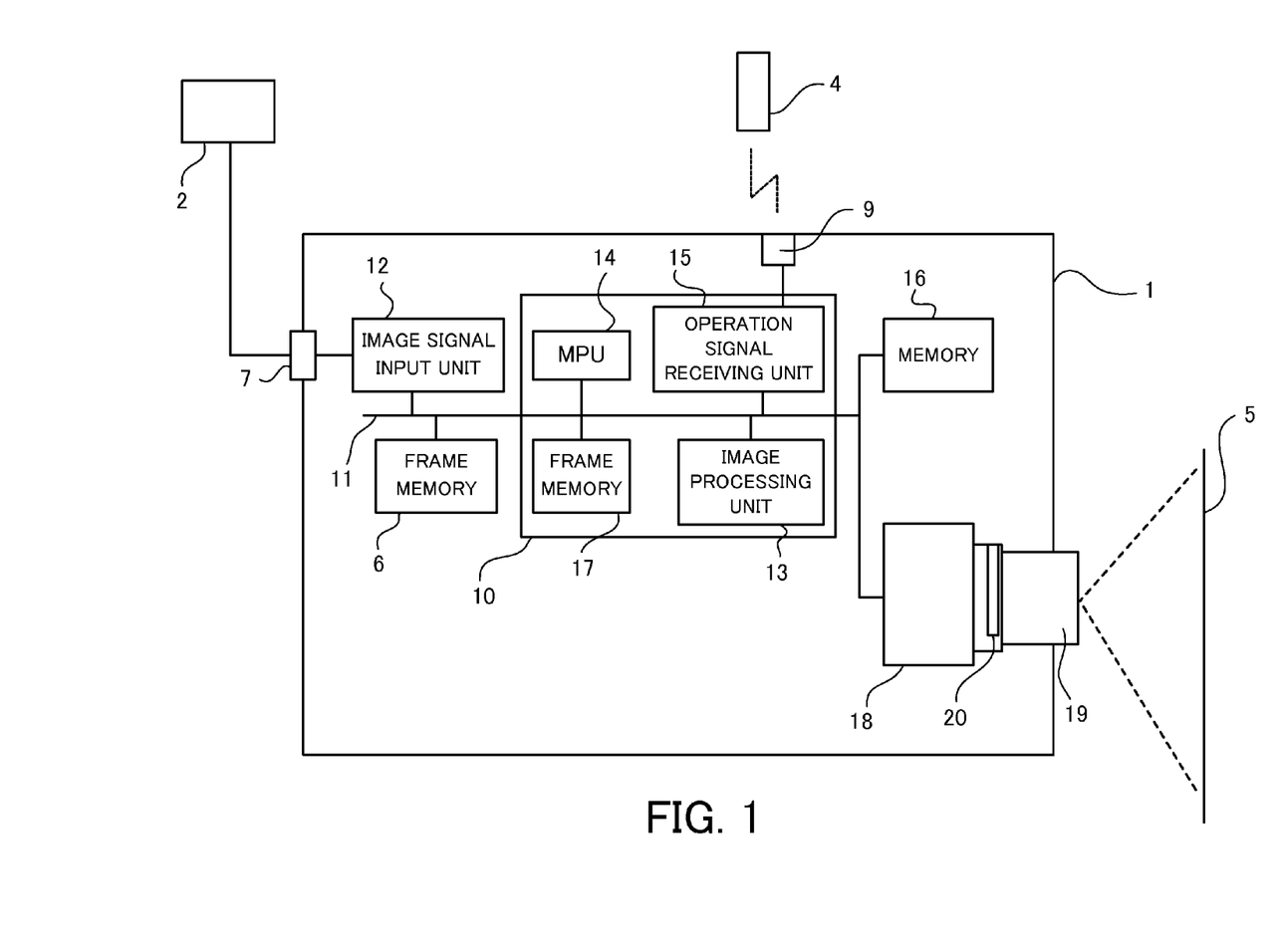
FIG. 1 is a block diagram of an image projection apparatus in a first embodiment.

First of all, referring to FIG. 1, the configuration of an image projection apparatus (lens-interchangeable liquid crystal projector) in a first embodiment of the present invention will be described. FIG. 1 is a block diagram of an image projection apparatus 1 (projector).

A user operates an infrared remote control 4 (remote controller) to send an operation signal (control signal) to the image projection apparatus 1. An infrared receiving unit 9 receives the operation signal sent from the infrared remote control 4. An operation signal receiving unit 15 in a controller 10 analyzes the operation signal received by the infrared receiving unit 9. An image output apparatus 2, which is an external image signal output apparatus, outputs an image (image signal) to the image projection apparatus 1. A projection image formed by the image projection apparatus 1 is magnified and projected on a screen 5 provided outside the image projection apparatus 1.

The image projection apparatus 1 is provided with a frame memory 6, an image signal input unit 12, the controller 10, a memory 16, an image projection unit 18 (projection unit), a lens unit 19, and a lens shift unit 20 (shift unit, lens shifter, or lens displacement unit). These elements are connected with each other via an internal bus 11 to communicate the control signal, the image signal, attached lens information, and the like. The image (image signal) output from the image output apparatus 2 is input to the image signal input unit 12 via a connection terminal 7. The image signal input unit 12 analyzes an image format (video format) of the input image signal and tentatively stores it in the frame memory 6 to perform data processing as a digital image signal. The connection terminal 7 is for example HDMI®, but is not limited thereto.

An MPU 14 (control unit) in the controller 10 executes a control program. In this case, the MPU 14 reads the control program of this embodiment for example from the memory 16 including a Flash ROM and a RAM to execute the control program.

The image signal loaded and stored in the frame memory 6 is output to an image processing unit 13 in the controller 10. The image processing unit 13 performs processing such as a resolution conversion and a gradation correction on the input image signal, and stores the processed image signal in a frame memory 17 in the controller 10. The image processing unit 13 performs the resolution conversion by using a scaler, and performs processing such as scaling processing, an aspect conversion, and a keystone conversion processing when a resolution of the input image signal and a resolution of a liquid crystal panel are different from each other. The MPU 14 controls the image signal stored in the frame memory 17 to perform light modulation by using a liquid crystal drive unit provided in the image projection unit 18, and then it outputs the image signal.

The image projection unit 18 for example includes a light source drive circuit, a light source lamp, and an illumination optical system including an optical element such as a fly-eye lens and a condenser lens. Illumination light emitted from the light source lamp enters a dichroic mirror. Color lights separated by the dichroic mirror into red-color band light, green-color band light, and blue-color band light pass through different optical paths, and they enter three-color liquid crystal panels, respectively.

The modulated lights which are separated onto and modulated by the respective liquid crystal panels are synthesized by a color synthesis dichroic prism, and then the synthesized light is projected on the screen 5 provided outside the image projection apparatus 1 via an optical system of the lens unit 19 (interchangeable projection lens unit). The lens unit 19 includes a plurality of lens units such as a zoom lens, a focus lens, and a fixed lens, a lens drive unit which drives each lens unit, and an encoder which detects a position of the lens unit.

The lens shift unit 20 (shift unit or lens displacement unit) includes a lens mount which connects the lens unit 19 (projection lens unit) and a shift mechanism (displacement mechanism) capable of moving (displacing) the lens unit 19 in a horizontal direction and a vertical direction both of which are directions orthogonal to an optical axis direction.

The lens shift unit 20 further includes a motor which moves (shifts or displaces) the lens unit 19 (lens) in the horizontal direction and the vertical direction and an encoder (detector) which detects a moving amount (shift amount or displacement amount) or a position (shift position or displacement position) of the lens.

The control signal (operation signal) sent from the infrared remote control 4 by the user is received by the infrared receiving unit 9. Then, the operation signal receiving unit 15 receives the control signal received by the infrared receiving unit 9 as an operation instruction which matches a previously-defined remote operation signal. The MPU 14 drives the motor of the lens unit 19 or the lens shift unit 20 based on the operation instruction. The user sends the MPU 14 an instruction to control the lens unit 19 or the lens shift unit 20 (i.e. performs a lens control instruction) to align the projection image with a desired area. Accordingly, the user can adjust, via the MPU 14, a lens position such as a focus lens position, a zoom lens position, and a lens shift position (lens displacement position).

In this embodiment, the position (zoom lens position) of the zoom lens unit in the lens unit 19 is detected for example by using a linear encoder with 10 bits. This linear encoder is a sensor which detects a position as an output of a variable resistor to detect position information of a cam ring of the zoom lens unit. The linear encoder is for example capable of detecting the position by performing an analog-to-digital conversion by outputting 0 when the zoom lens unit is located at a telephoto end (Tele end), and by outputting 1023 when the zoom lens unit is located at a wide-angle end (Wide end).

Figure 2:
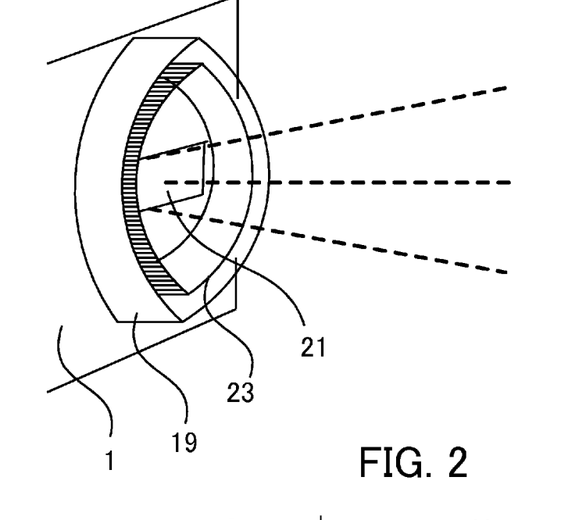
FIG. 2 is an explanatory diagram of the image projection apparatus (in a projection state of 0% shift) in the first embodiment.
Figure 3A:
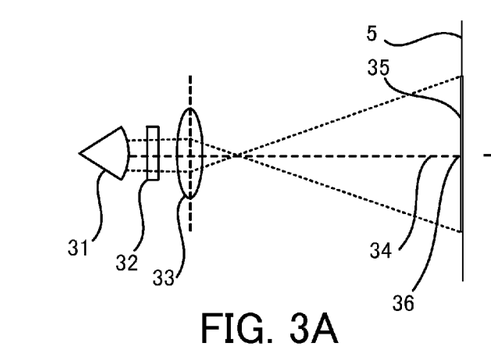
FIGS. 3A and 3B are explanatory diagrams of the image projection apparatus (projection screen in the projection state of 0% shift) in the first embodiment.

Subsequently, referring to FIGS. 2, 3A, and 3B, the lens shift position of the image projection apparatus 1 will be described. FIG. 2 is an explanatory diagram of the lens shift position (lens displacement position) of the image projection apparatus 1 (in a projection state of 0% shift), and illustrates a state where a lens barrel 23 of the lens unit 19 is located at 0% shift position. FIG. 3A is a schematic diagram of the image projection apparatus 1 seen from a side in the state of FIG. 2, and illustrates a diagram of explaining the lens shift and the optical axis in FIG. 2.

Light emitted from a light source lamp 31 is modulated by a light modulation element 32. A liquid crystal panel, a DMD (Digital Mirror Device), or the like can be used as the light modulation element 32. In FIG. 3A, a lens unit in the lens barrel 23 is schematically indicated as a lens 33. A projection light passing area 21 (light passing area) passing through a center of the lens 33 is projected as a projection image 35 on the screen 5. The lens unit 19 is constituted for example by 21 lenses, and they are housed inside the lens barrel 23. In FIG. 3A, these lenses are simply indicated as the lens 33. In this case, with respect to a projection image center 34, the projection image 35 enters the screen 5 in a direction perpendicular to the surface of the screen 5, and therefore the brightest (highest luminance) projection image can be obtained if a distance from the lens 33 to the screen 5 is identical.

Figure 3B:
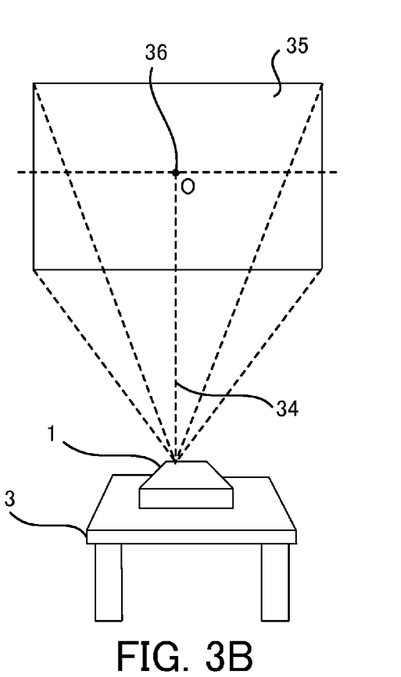

FIG. 3B illustrates a position relation between the front of the screen 5 and a projection stand 3 and the image projection apparatus 1 when the image projection apparatus 1 of FIG. 2 is seen from the back. The projection image center 34 of the image projection apparatus 1 perpendicularly enters the screen 5 at a position 36 on the screen 5, and it coincides with a center O of the projection image 35.

Figure 4:
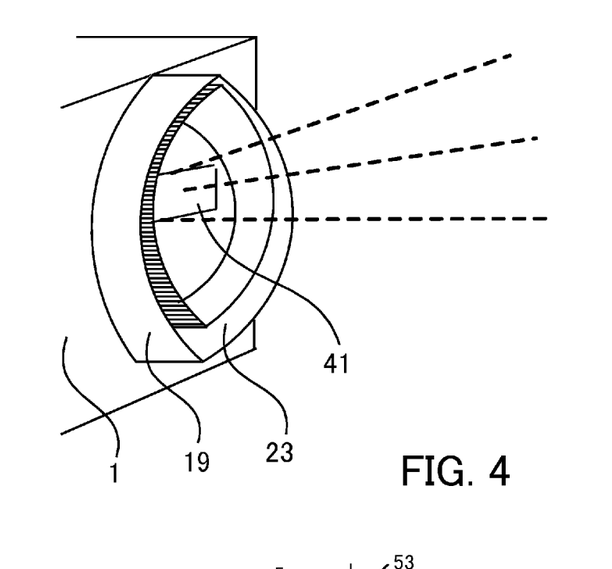
FIG. 4 is an explanatory diagram of the image projection apparatus (in a projection state of 50% shift) in the first embodiment.
Figure 5A:
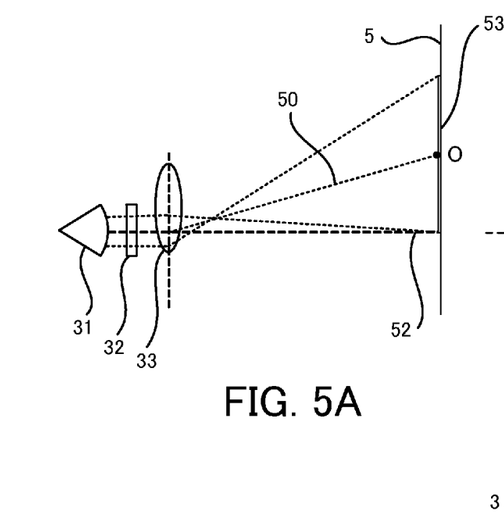
FIGS. 5A and 5B are explanatory diagrams of the image projection apparatus (projection screen in the projection state of 50% shift) in the first embodiment.

Subsequently, referring to FIGS. 4, 5A, and 5B, a case in which the lens position of the image projection apparatus 1 is shifted (moved or displaced) from the lens position of FIG. 2 will be described. FIG. 4 is an explanatory diagram of the lens shift position of the image projection apparatus 1 (in a projection state of 50% shift), and illustrates a state in which the lens barrel 23 is located at a 50% shift position relative to the state of FIG. 2 (projection state of 0% shift). In other words, the lens shift position of FIG. 4 is in a state where the lens barrel 23 is shifted in the image projection apparatus 1 and a projection plane is moved upward by 50% relative to the 0% shift position at which the image is projected at the lens center of FIG. 2. FIG. 5A is a schematic diagram of the image projection apparatus 1 seen from the side in the state of FIG. 4, and illustrates a diagram of explaining the lens shift and the optical axis in FIG. 4.

The liquid crystal panel as the light modulation element 32 provided inside the image projection apparatus 1 is fixed. Therefore, the lens barrel 23 (lens 33) is moved (shifted or displaced) in the vertical direction (upward direction of FIG. 5A) relative to the body of the image projection apparatus 1. Thus, the image projection apparatus 1 is designed to shift a projection image center 50 of a projection image vertically by a height of 50% relative to the position of the projection image center 34 of FIGS. 3A and 3B. In this mechanism, a lower end position of the projection image can be fixed to the same height (vertical incident portion 52) as that of the image projection apparatus 1, and a degree of freedom of an installation site such as installation on the desk or suspended from a ceiling can be improved. On the other hand, since a distance between the projection image center 50 and the screen 5 is increased, it is disadvantageous in the luminance or evenness of the projection image compared to the state of 0% shift illustrated in FIGS. 3A and 3B.

Figure 5B:
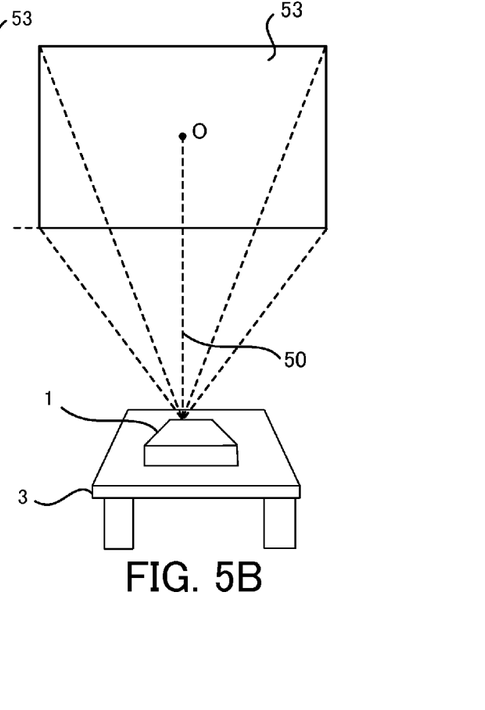

FIG. 5B illustrates a position relation between the front of the screen 5 and the projection stand 3 and the image projection apparatus 1 when the image projection apparatus 1 of FIG. 4 is seen from the back. The projection image center 50 of the image projection apparatus 1 coincides with a center O of a projection image 53 on the screen 5, but it does not coincide with the vertical incident portion 52.

Figure 6:
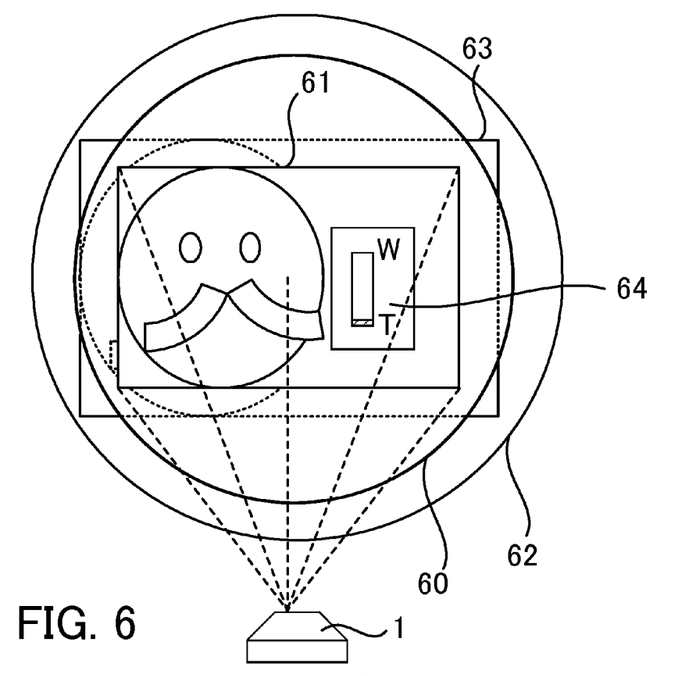
FIG. 6 is an explanatory diagram of the image projection apparatus (optical zooming in the projection state of 0% shift) in the first embodiment.

Subsequently, referring to FIG. 6, optical zooming in the projection state of 0% shift (the state of FIGS. 2, 3A, and 3B) will be described. FIG. 6 is an explanatory diagram of the optical zooming in the projection state of 0% shift. When the zoom lens unit constituted by the plurality of lenses are located at the Tele end, the projection light (projection image) is projected on an area 61 of the screen. The lens is movable (i.e. shiftable) within a projectable range 60. A shiftable effective range (shift effective range or displacement effective range) varies depending on a type of the lens because of occurrence of a shadow. For example, in this embodiment, the shift effective range is previously stored, as a radius from a center of the lens, in the memory 16 of the image projection apparatus 1, and at the time of starting the image projection apparatus 1, the controller 10 loads the attached lens information and acquires the shift effective range of the lens 33.

At the time of performing the shift operation of the lens 33, a shift amount (shift position or displacement position) from the center of the lens is adjusted so that an area (area 61) where light modulated by the liquid crystal panel passes does not exceed an effective area (projectable range 60) represented as a moving distance with respect to the center of the lens. When receiving a zoom instruction from the user, the MPU 14 which executes a control program drives the zoom lens unit inside the lens unit 19 in a Wide direction to magnify the projection image. In this case, upper, lower, right, and left sides of the projection image move in respective directions away from the center of the image while the center of the projection image is fixed, and for example with respect to the area where the light passes, the area 61 is magnified and projected as an area 63. In this time, also with respect to the shiftable range, the projectable range 60 is expanded to a projectable range 62. The position of the zoom lens unit is recognized by a gauge 64 which indicates for example the Wide end at the upper side and the Tele end at the lower side with a blue color.

Figure 7:
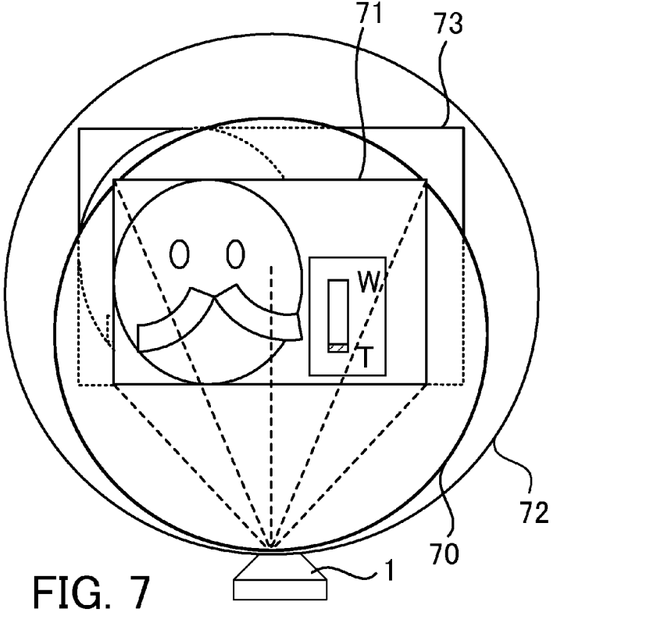
FIG. 7 is an explanatory diagram of the image projection apparatus (optical zooming in the projection state of 50% shift) in the first embodiment.

Subsequently, referring to FIG. 7, the optical zooming in the projection state of 50% shift (the state of FIGS. 4, 5A, and 5B) will be described. FIG. 7 is an explanatory diagram of the optical zooming in the projection state of 50% shift. In this case, with respect to the light modulated by the liquid crystal panel, a shadow occurs in a projection image 71. Therefore, according to an instruction by the user, the controller 10 drives a motor (shift motor) and acquires a shift amount by using the encoder to limit a shift moving amount within a range which does not exceed a previously-stored projectable range 70 (lens effective area). When the optical zooming is performed by moving the zoom lens unit from the Tele end to the Wide end, only the lower side of the projection image is fixed and the other three sides (i.e. upper, right, and left sides) are moved from the center to the outside. As a result, the center of the projection image 71 is moved upward to be a projection image 73, and a bright projection can be performed since part near the center of the lens is within a range where the projection light passes. In this time, also with respect to the shiftable range, the projectable range 70 is expanded to a projectable range 72.

Figure 8:
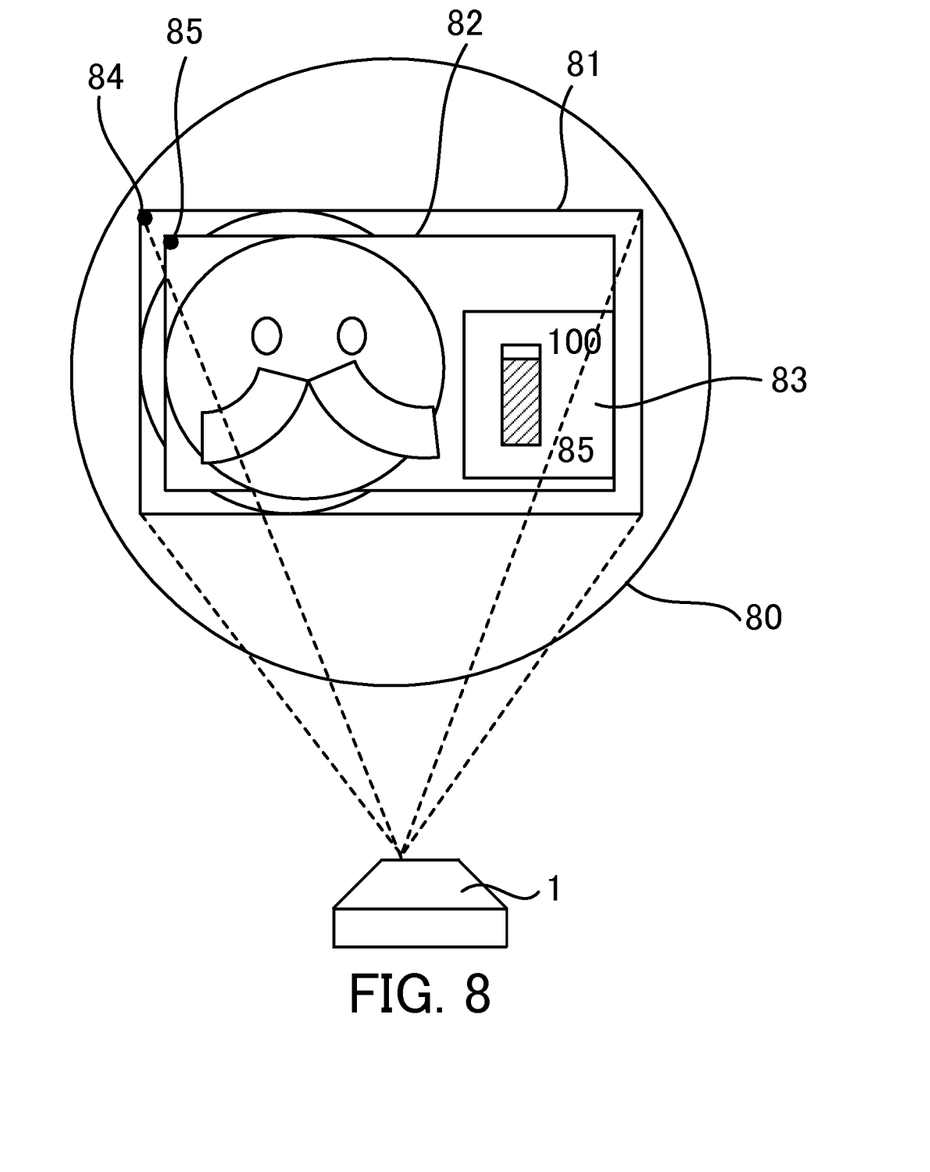
FIG. 8 is an explanatory diagram of the image projection apparatus (electronic zooming in the projection state of 0% shift) in the first embodiment.

Subsequently, referring to FIG. 8, electronic zooming in the projection state of 0% shift (the state of FIGS. 2, 3A, and 3B) will be described. FIG. 8 is an explanatory diagram of the electronic zooming in the projection state of 0% shift. In this embodiment, a shiftable range (projectable range 80) is the same as a range for the Tele end of the zoom lens unit. The projection image is formed with reference to the center of the liquid crystal panel. Therefore, similarly to the optical zooming described above, a projection image 82 is projected on the screen while the center of the projection image is fixed and each of the upper, lower, right, and left sides of a projection image 81 is moved toward the center of the image. In other words, the image is formed on the liquid crystal panel (light modulation element 32) centered at the optical axis, as a predetermined position, of the projection lens (optical system of the lens unit 19). A gauge 83 which indicates a magnification rate of the electronic zooming is superimposed and displayed on a projection image 82. In this embodiment, the MPU 14 performs the electronic zooming described above when the zoom lens unit is located at the Tele end, and it performs the optical zooming by moving the zoom lens unit in other cases.

Figure 9:
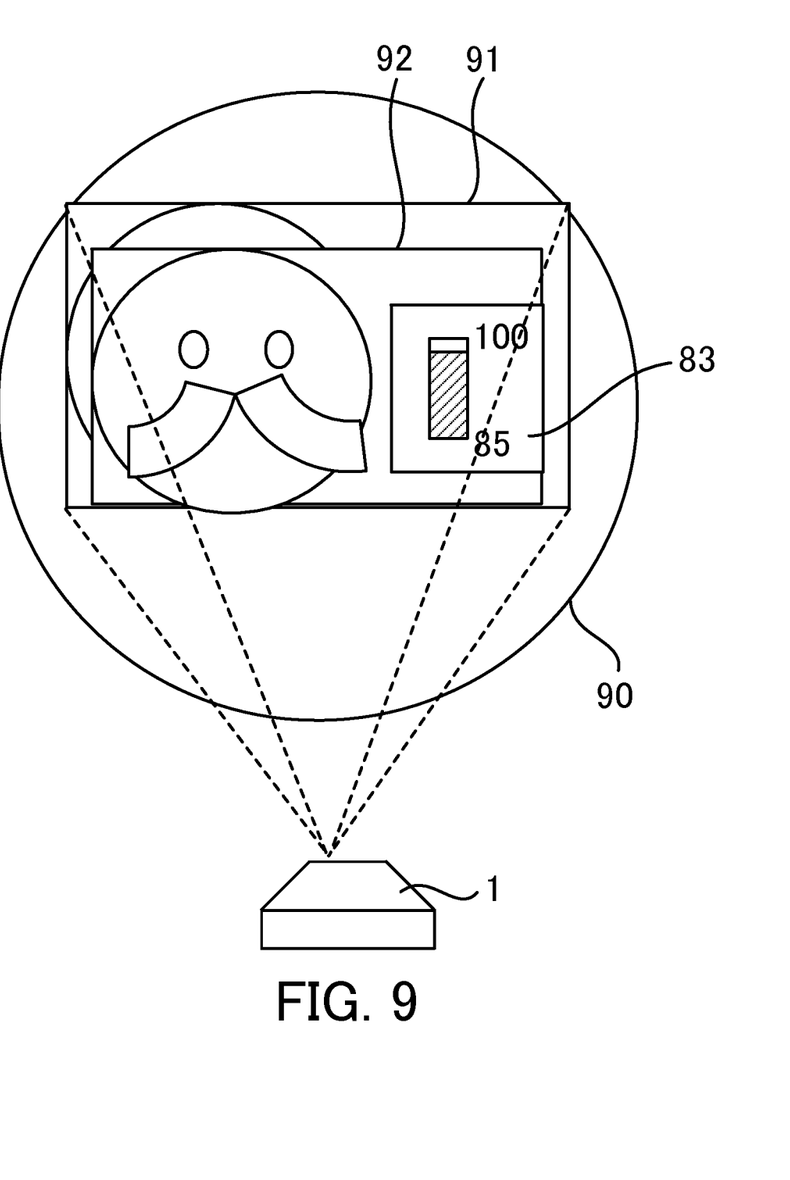
FIG. 9 is an explanatory diagram of the image projection apparatus (electronic zooming in the projection state of 50% shift) in the first embodiment.

Subsequently, referring to FIG. 9, the electronic zooming in the projection state of 50% shift (the state of FIGS. 4, 5A, and 5B) will be described. FIG. 9 is an explanatory diagram of the optical zooming in the projection state of 50% shift. In this embodiment, a shiftable range (projectable range 90) is a shiftable range for a projection image 91 at the Tele end of the zoom lens unit. The projection image is formed with reference to the lower end of the liquid crystal panel. Therefore, similarly to the optical zooming, the center of the image is moved downward and a projection image 92 is projected on the screen while the lower end of the projection image is fixed and each of the upper, right, and left sides of the projection image 91 is moved toward the center. In other words, the image is formed on the liquid crystal panel (light modulation element 32) centered at the optical axis, as a predetermined position, of the projection lens. The MPU 14 performs the electronic zooming described above when the zoom lens unit is located at the Tele end, and it performs the optical zooming by moving the zoom lens unit in other cases.

In this embodiment, the MPU 14 selects an electronic zoom mode depending on position information (zoom position information) of the zoom lens unit according to the control program. Typically, the electronic zooming cuts part of an input image, and it magnifies the cut image to project it on a projection area. The electronic zoom mode of this embodiment uses a deforming function of the image processing unit 13 and sets part of the liquid crystal panel as an image formation area to reduce and project an entire input image. In other words, the MPU 14 electronically reduces the image formation area (projection area) to perform a fine adjustment of the projection area limited for an installation site of the image projection apparatus 1. For example, a starting coordinate (f,g) of the image formation can be represented by the following expressions (1) and (2), where W and H are respectively a width and a height of the image formation area, m is a reduction rate of the electronic zooming, and sx and sy are respectively the shift amounts in the x and y directions.

$$f(sx)=W(1-m)(50+sx)/100 \quad (1)$$

$$g(sy)=H(1-m)(50+sy)/100 \quad (2)$$

For example, when the resolution of the liquid crystal panel is 1920×1200 pixels, the user operates a zoom button of the infrared remote control 4 to superimpose and project a dialogue (adjustment dialogue) for zooming on a projection screen. The user gives an instruction to change a reduction rate of the projection screen with each input of a down-arrow button. For example, the reduction rate is changed, as illustrated in Table 1 below, for reduction zooming of an electronic zoom area according to expression (2), and the number of pixels in height (number of pixels) of the calculated image formation area (range where the electronic zooming is to be performed) is set to the scaler. Similarly, with respect to a width direction, the setting is performed according to expression (1), and accordingly the scaling formation is performed while an aspect of the input image is maintained and the input image is projected as a reduction image.

TABLE 1

| reduction rate m | shift amount sy | starting coordinate of image formation g (sy) | number of pixels in height of image formation area | number of remaining pixels to be depicted |
|---|---|---|---|---|
| 0.99 | 0% | 6 | 1188 | 6 |
|  | 30% | 9 |  | 3 |
|  | 50% | 12 |  | 0 |
| 0.98 | 0% | 12 | 1176 | 12 |
|  | 30% | 19 |  | 5 |
|  | 50% | 24 |  | 0 |
| ... | ... | ... | ... | ... |
| 0.80 | 0% | 120 | 960 | 120 |
|  | 30% | 192 |  | 48 |
|  | 50% | 240 |  | 0 |

According to this embodiment, an image formation coordinate (i.e. position of a range where electronic zooming is to be performed) can be changed depending on a shift amount (shift position or displacement position) of a lens and a reduction rate.

Second Embodiment

Next, an image projection apparatus in a second embodiment of the present invention will be described. The image projection apparatus of this embodiment includes a fixed focal lens that has a fixed focal length. The fixed focal lens is not provided with a zoom lens unit, and accordingly it is capable of obtaining a bright projection image with a small number of lenses. However, in the image projection apparatus with the fixed focal lens, a size of the projection image needs to be adjusted by moving the image projection apparatus back and forth. If there is an obstacle, which is not avoidable, at an installation site of the image projection apparatus, the installation site needs to be changed. In this case, the image projection apparatus of this embodiment performs electronic zooming described referring to FIG. 8. In the fixed focal lens, a zoom encoder is not provided. Therefore, the fixed focal lens (lens barrel) is controlled to always output 0 as position information of the zoom lens unit.

It is necessary to set a position of an image formed on the liquid crystal panel so that an optimum area of an optical lens is used to be able to obtain the brightest projection image. In other words, it is preferred that an area near the center of the lens is used as an image formation area even in the electronic zooming. Since a lens position at the 0% shift corresponds to the lens position illustrated in FIG. 8, the image formation area is calculated to set the position of the projection image. On the other hand, since a lens position at the 50% shift corresponds to the lens position illustrated in FIG. 9, the image formation area on the liquid crystal panel is calculated to fix the lower end of the projection image to set the position of the projection image.

Figure 10:
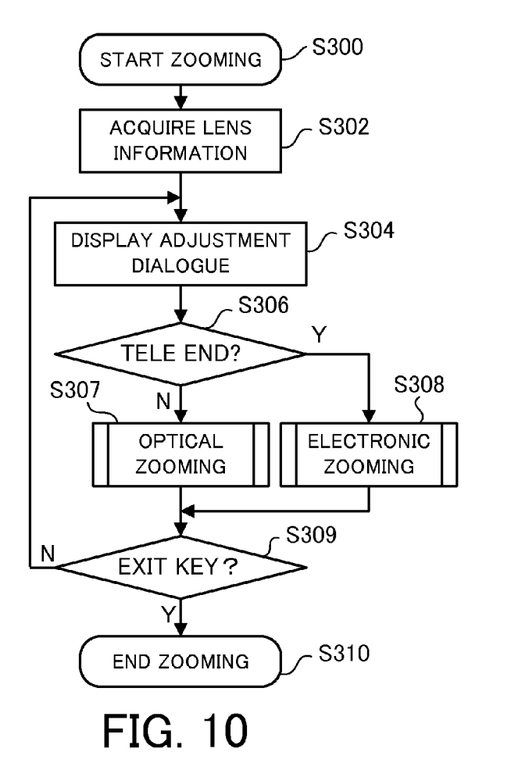
FIG. 10 is a flowchart of illustrating a zooming method in a second embodiment.

Next, referring to FIG. 10, a zooming method in this embodiment will be described. FIG. 10 is a flowchart of illustrating the zooming method. Each step in FIG. 10 is performed based on mainly an instruction of a controller or control unit (MPU 14).

First, at step S300, the MPU 14 which executes the control program stored in the memory 16 starts zooming (zoom control) when receiving a signal (control signal) allocated for the zoom button via the operation signal receiving unit 15. Subsequently, at step S302, the MPU 14 (acquisition unit) acquires information (lens information or lens ID containing optical axis information) related to the lens attached to the image projection apparatus 1. Then, at step S304, the MPU 14 superimposes and displays a dialogue (adjustment dialogue) for zooming on the screen 5 (projection screen).

Subsequently, at step S306, the MPU 14 acquires a zoom lens position (lens position), and it determines whether the lens position is the Tele end. When the lens position is not the Tele end, the flow proceeds to step S307. At step S307, the MPU 14 performs optical zoom lens drive (optical zooming). Subsequently, at step S309, the MPU 14 determines whether the operation (Exit Key) of closing the adjustment dialogue is performed by the user. When the operation of closing the adjustment dialogue is performed, the flow proceeds to step S310, the zooming is finished. On the other hand, when the operation of closing the adjustment dialogue is not performed, the flow returns to step S304, and the MPU 14 updates the zoom lens position obtained by the encoder reading its change to display the updated zoom lens position on the screen, and it continues the zooming.

On the other hand, when the lens position is the Tele end at step S306 or a focal length is minimized or a fixed focal lens (single focus lens) is used, the flow proceeds to step S308. At step S308, the MPU 14 switches the zoom mode from the optical zoom mode to the electronic zoom mode to perform the electronic zooming. In the electronic zooming, the MPU 14 calculates the image formation area depending on the shift amount to determine a projection range as described in the first embodiment. The flowchart of FIG. 10 can be applied also to the first and third embodiments.

According to the image projection apparatus of this embodiment, a coordinate of the image formation area is switched (set) based on information (lens information) related to the attached lens when performing the electronic zooming. Thus, the center of the projection image can be moved toward a brighter direction.

Third Embodiment

Next, an image projection apparatus in a third embodiment of the present invention will be described. The image formation area set in the second embodiment can be changed depending on an aspect ratio of an input image. In other words, when a projection image is shifted and projected upward by the 50% shift, a light efficiency is good and a bright projection image can be obtained in an area near the center of a lens.

Figure 11:
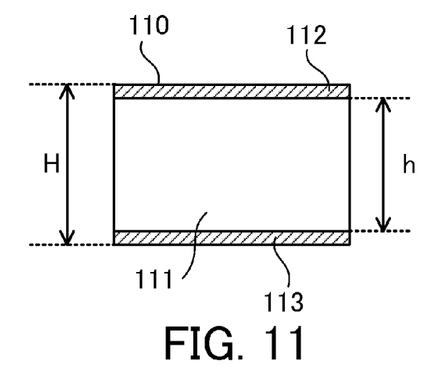
FIG. 11 is an explanatory diagram of setting an image formation coordinate in the projection state of 0% shift in a third embodiment.
Figure 12:
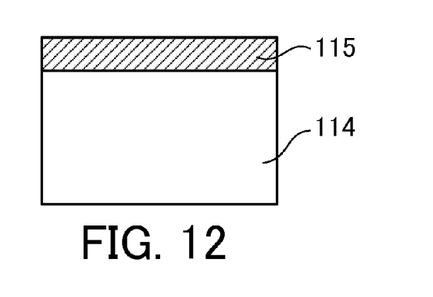
FIG. 12 is an explanatory diagram of setting an image formation coordinate in the projection state of 50% shift in the third embodiment.

FIG. 11 is an explanatory diagram of setting an image formation coordinate by the 0% shift in this embodiment. FIG. 12 is an explanatory diagram of setting the image formation coordinate by the 50% shift. For example, when an input image includes signals of 1920×1080 as illustrated in FIG. 11, a liquid crystal panel 110 with 1920×1200 pixels is used. In other words, while a height h of the input image corresponds to 1080 pixels, a height H of the liquid crystal panel 110 corresponds to 1200 pixels. Therefore, with respect to 120 pixels of the liquid crystal panel 110 in a vertical direction, a black zone (non-image area) is depicted. In this case, typically (including the case of the 0% shift), the image formation is performed equally with respect to the center of the liquid crystal panel 110, and black zones 112 and 113 are inserted in 60 pixels at each of the upper and lower sides to set an image area 111. In this embodiment, however, as illustrated in FIG. 12, an image area 114 is set in the 50% shift and 120 pixels at the upper side are used as a black zone 115. In other words, the MPU 14 determines an effective image area on the liquid crystal panel 110 depending on a shift position to perform control so as to obtain a brighter projection image.

A panel resolution and a resolution of the input image may be different from each other in some cases. Therefore, a starting coordinate (f,g) of the image formation is represented by the following expressions (3) and (4) where w and h are respectively the numbers of horizontal effective pixels and vertical effective pixels, in addition to expressions (1) and (2) described in the first embodiment.

$$f(sx)=(W-w\cdot m)(50+sx)/100 \quad (3)$$

$$g(sy)=(H-h\cdot m)(50+sy)/100 \quad (4)$$

Table 2 indicates an example of the starting coordinate of the image formation area depending on the reduction rate and the shift amount of the lens. In the optical zooming, the light passing area is magnified or deduced by the zoom operation. On the other hand, in the electronic zooming, the resolution is deteriorated compared to the optical zooming since part of the light passing area is used as an effective image area. Accordingly, although the operation is easy in unifying the zoom operation method and the user does not have to identify the operation, but it may be inconvenient in some cases because the deterioration of the image quality cannot be recognized.

TABLE 2

| reduction rate m | shift amount sy | starting coordinate of image formation g (sy) | number of pixels in height of image formation area | number of remaining pixels to be depicted |
|---|---|---|---|---|
| 1 | 0% | 60 | 1080 | 60 |
|  | 30% | 96 |  | 24 |
|  | 50% | 120 |  | 0 |
| 0.99 | 0% | 65 | 1069 | 66 |
|  | 30% | 104 |  | 27 |
|  | 50% | 130 |  | 1 |
| 0.98 | 0% | 71 | 1058 | 71 |
|  | 30% | 113 |  | 29 |
|  | 50% | 141 |  | 1 |
| ... | ... | ... | ... | ... |
| 0.80 | 0% | 168 | 864 | 168 |
|  | 30% | 268 |  | 68 |
|  | 50% | 336 |  | 0 |

In this embodiment, in the optical zooming operation, the gauge 64 is depicted with a blue color. When the user presses a down-arrow key of the infrared remote control 4, the zoom lens (zoom lens unit) performs zooming continuously from the Wide end to the Tele end and the position information of the zoom lens is depicted in the gauge 64. When the zoom lens reaches the Tele end position, the zoom encoder detects the position and the depiction in the gauge 64 is tentatively stopped. When the user further presses the down-arrow key of the infrared remote control 4, the mode is transferred from the optical zoom mode to the electronic zoom mode.

Figure 13:
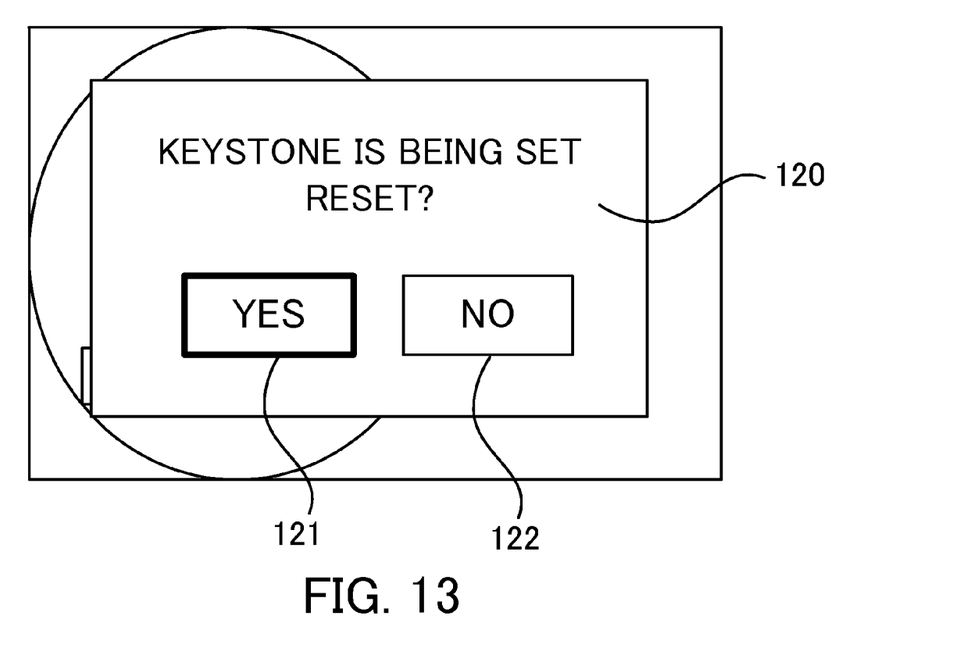
FIG. 13 is an explanatory diagram of a reset confirmation screen of a keystone set value in the third embodiment.

When adjusting the installation site of the image projection apparatus in this embodiment, it is preferred that the MPU 14 allows the user to confirm whether a set value is to be reset in order to prevent the deterioration of the image quality caused by a keystone setting. In this case, for example, a confirmation screen 120 as illustrated in FIG. 13 is displayed. FIG. 13 is an explanatory diagram of a reset confirmation screen of the keystone set value in this embodiment. When resetting the keystone, the user selects a button 121 to reset the keystone set value to 0 according to the control program of this embodiment. On the other hand, when the user does not reset the keystone set value, the user selects a button 122 to transfer to the electronic zoom mode without changing the set value according to the control program.

When the keystone set value is 0, the confirmation by the user is unnecessary and accordingly the mode is transferred to the electronic zoom mode without displaying the confirmation screen 120 and the gauge 83 (magnification/reduction gauge) is depicted with an orange color. During setting the image formation area, an orange starting coordinate 84 (FIG. 8) is depicted at the upper-left end of the image area. Then, the starting coordinate 84 is moved to a starting coordinate 85 obtained after the reduction setting to be depicted.

On the other hand, when the user presses an up-arrow key of the infrared remote control 4 at the 100% end position in the electronic zooming, the mode is transferred from the electronic zoom mode to the optical zoom mode. In the optical zoom mode (FIG. 6) in which the deterioration of the image does not occur, the reset confirmation step is omitted and the gauge 64 is depicted. Although a mark is not added to the starting coordinate of the image in the optical zoom mode, a frame is marked to notify the user in the electronic zoom operation and accordingly the user can distinguish both the current zoom modes by the color of the gauge and the mark at the coordinate.

In this embodiment, when the keystone setting is made, the MPU 14 allows the user to confirm whether the setting is to be reset, but the setting can be reset without the confirmation.

With respect to the method of the electronic zooming for the projection area of the image projection apparatus 1, the control method of setting the image formation area depending on the shift state of the lens is described. It is preferred that the determination as to whether the keystone setting is to be reset is performed, similarly to the zooming operation described above, to prevent the deterioration of the image quality even in the lens shift operation. This control is not limited to the liquid crystal projector, but for example it is effective also for an image projection apparatus using a digital micro mirror As described above, the image projection apparatus 1 of each embodiment is an image projection apparatus in which an optical axis of a projection lens for projecting an image and a center position of an image formation area on a light modulation element may be displaced (shifted) relative to each other, and it includes an electronic zoom unit (image processing unit 13) and a control unit (MPU 14). The electronic zoom unit magnifies or reduces a size of the image formation area on the light modulation element by electronic zooming centered at a predetermined position. The control unit controls the electronic zoom unit to perform the electronic zooming with the predetermined position as the optical axis.

Preferably, the image projection apparatus further includes an acquisition unit (controller 10) which acquires lens information of the projection lens and a lens shift unit 20 (lens shifter) which shifts the projection lens. The lens information contains information indicating a shift position of the lens shift unit. The control unit changes the predetermined position depending on the shift position of the lens shift unit. More preferably, the control unit increases a change amount of the predetermined position with an increase of a change of the shift position when performing the electronic zooming.

Preferably, the control unit controls the predetermined position to be fixed when the shift position is located at a center of the optical axis of the projection lens. On the other hand, the control unit moves the predetermined position to a second direction opposite to a first direction when the shift position of the projection lens in the first direction is located other than at the center of the optical axis of the projection lens. Preferably, the control unit changes a position of the image formation area on the light modulation element and the number of pixels. Preferably, the control unit changes the predetermined position to include an area where a distance from the projection lens to a projection plane is minimized in the image formation area. Preferably, the control unit changes the predetermined position to include an area passing through the optical axis in the image formation area. Preferably, the control unit changes the predetermined position to include a brightest area of the projection lens in the image formation area. Preferably, the center of the image formation area is a center position of the projected image.

Preferably, the lens information contains information indicating a zoom position of the projection lens, and the control unit changes the predetermined position depending on the zoom position of the projection lens. More preferably, the control unit sets a zoom mode selected among from at least one of an optical zoom mode and an electronic zoom mode depending on the lens information. The control unit drives the projection lens to change a focal length when the optical zoom mode is set. On the other hand, the control unit sets the image formation area electronically when the electronic zoom mode is set. More preferably, the lens information contains information indicating that the projection lens is located at a telephoto end (Tele end). The control unit sets the zoom mode to the electronic zoom mode when the projection lens is located at the telephoto end.

Preferably, the control unit sets, depending on the lens information, magnification rates at a telephoto end of optical zooming and at 100% end of the electronic zooming to be identical to be capable of continuously switching one zoom mode to the other zoom mode. Preferably, the control unit allows a user to confirm whether a keystone setting is to be reset when the keystone setting is made in switching the zoom mode depending on the lens information. Preferably, the control unit resets, depending on the lens information, the keystone setting when the zoom mode is switched. Preferably, the lens information contains information indicating that the projection lens is a fixed focal lens. The control unit sets the zoom mode to the electronic zoom mode when the projection lens is the fixed focal lens.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image projection apparatus of each embodiment can set a bright part of a projection area as an image formation area by moving the center of an image during electronic zooming, and accordingly it can obtain an optimum projection image. When the image projection apparatus receives a zoom instruction while a fixed focal lens is attached to the image projection apparatus, it can obtain an appropriate projection image by performing the electronic zooming in which an electronic image formation area is set depending on a shift position. It is easy to distinguish the optical zooming and the electronic zooming by showing the image formation area in the electronic zoom mode. Thus, each embodiment can provide an image projection apparatus capable of appropriately performing electronic zooming depending on lens information such as a shift position of a lens, a method of controlling the image projection apparatus, and a non-transitory computer-readable storage medium. In addition, each embodiment can provide a zooming method of controlling a change amount of the center of zooming while switching continuously the optical zooming and the electronic zooming depending on the lens information to be easily operated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-162212, filed on Aug. 8, 2014, and No. 2015-094667, filed on May 7, 2015, which are hereby incorporated by reference wherein in their entirety.

What is claimed is:

1. An image projection apparatus comprising:
a light source;
a projection lens;
a light modulation element including an image formation area on which an image is formed;
an electronic zoom unit configured to perform electronic zooming by magnifying or reducing a size of the image formation area on the light modulation element by electronic zooming centered at a predetermined position; and
a control unit configured to control the electronic zoom unit to perform the electronic zooming using an optical axis of the projection lens as the predetermined position,
wherein, in a case where a center of the image formation area on the light modulation element is not shifted with respect to the optical axis of the projection lens, the control unit is configured to control the electronic zoom unit without changing the center position of the image formation area on the light modulation element while performing electronic zooming, and
wherein, in a case where the center of the image formation area on the light modulation element is shifted with respect to the optical axis of the projection lens, the control unit is configured to control the electronic zoom unit so as-to change the center position of the image formation area on the light modulation element during the electronic zooming, while performing the electronic zooming based on a shift position of the projection lens relative to the light modulation element.

2. The image projection apparatus according to claim 1, further comprising:
an acquisition unit configured to acquire lens information of the projection lens; and
a lens shift unit configured to shift the projection lens,
wherein the lens information contains information indicating a shift position of the lens shift unit, and
wherein the control unit is configured to change the predetermined position depending on the shift position of the lens shift unit.

3. The image projection apparatus according to claim 2, wherein the control unit is configured to increase a change amount of the predetermined position with an increase of a change of the shift position when performing the electronic zooming.

4. The image projection apparatus according to claim 2, wherein the control unit is configured to:
control the predetermined position to be fixed if the shift position is located at a center of the optical axis of the projection lens, and
move the predetermined position to a second direction opposite to a first direction if the shift position of the projection lens in the first direction is located other than at the center of the optical axis of the projection lens.

5. The image projection apparatus according to claim 2, wherein the control unit is configured to change a position of the image formation area on the light modulation element and the number of pixels.

6. The image projection apparatus according to claim 2, wherein the control unit is configured to change the predetermined position to include an area passing through the optical axis in the image formation area.

7. The image projection apparatus according to claim 2, wherein the control unit is configured to change the predetermined position to include, in the image formation area, a first part of the projected image that is brighter than a second part of the projected image projected by the projection lens.

8. The image projection apparatus according to claim 2, wherein the lens information contains information indicating a zoom position of the projection lens, and
wherein the control unit is configured to change the predetermined position depending on the zoom position of the projection lens.

9. The image projection apparatus according to claim 8, wherein the control unit is configured to:
set a zoom mode selected among from at least one of an optical zoom mode and an electronic zoom mode depending on the lens information,
drive the projection lens to change a focal length when the optical zoom mode is set, and
set the image formation area electronically when the electronic zoom mode is set.

10. The image projection apparatus according to claim 9, wherein the lens information contains information indicating that the projection lens is located at a telephoto end, and
wherein the control unit is configured to set the zoom mode to the electronic zoom mode when the projection lens is located at the telephoto end.

11. The image projection apparatus according to claim 9, wherein the control unit is configured to set, depending on the lens information, magnification rates at a telephoto end of optical zooming and at 100% end of the electronic zooming to be identical to be capable of continuously switching one zoom mode to the other zoom mode.

12. The image projection apparatus according to claim 9, wherein the control unit is operable to allow a user to confirm whether a keystone setting is to be reset when the keystone setting is made in switching the zoom mode depending on the lens information.

13. The image projection apparatus according to claim 9, wherein the control unit is configured to reset, depending on the lens information, a keystone setting when the zoom mode is switched.

14. The image projection apparatus according to claim 9, wherein the lens information contains information indicating that the projection lens is a fixed focal lens, and wherein the control unit is configured to set the zoom mode to the electronic zoom mode when the projection lens is the fixed focal lens.

15. The image projection apparatus according to claim 1, wherein the center position of the image formation area is a center position of the projected image.

16. The image projection apparatus according to claim 1, wherein the control unit is configured to control the electronic zoom unit to perform the electronic zooming with the predetermined position that changes depending on a type of the projection lens.

17. The image projection apparatus according to claim 1, further comprising an acquisition unit configured to acquire lens information including a lens ID of the projection lens attached to the image projection apparatus,
wherein the control unit is configured to control the electronic zoom unit to perform the electronic zooming with the predetermined position that changes depending on a type of the projection lens specified by the lens ID.

18. A method of controlling an image projection apparatus that includes a light source, a projection lens, and a light modulation element including an image formation area on which an image is formed, the method comprising:
performing electronic zooming by magnifying or reducing a size of the image formation area on the light modulation element, the electronic zooming centered at an optical axis of the projection lens as a predetermined position,
wherein, in a case where a center of the image formation area on the light modulation element is not shifted with respect to the optical axis of the projection lens, the center position of the image formation area on the light modulation element is not changed while performing electronic zooming, and
wherein, in a case where the center of the image formation area on the light modulation element is shifted with respect to the optical axis of the projection lens, the center position of the image formation area on the light modulation element is changed while performing the electronic zooming based on a shift position of the projection lens relative to the light modulation element.

19. The method according to claim 18, further comprising:
acquiring lens information of the projection lens; and
displacing the projection lens,
wherein the lens information contains information indicating a displacement position, and
wherein the step of performing the electronic zooming includes changing the predetermined position depending on the displacement position.

20. A non-transitory computer-readable storage medium which stores a program to cause a computer to execute a process of controlling an image projection apparatus that includes a light source, a projection lens, and a light modulation element including an image formation area on which an image is formed, the process comprising:
performing electronic zooming by magnifying or reducing a size of the image formation area on the light modulation element, the electronic zooming centered at an optical axis of the projection lens as a predetermined position,
wherein, in a case where a center of the image formation area on the light modulation element is not shifted with respect to the optical axis of the projection lens, the center position of the image formation area on the light modulation element is not changed while performing electronic zooming, and
wherein, in a case where the center of the image formation area on the light modulation element is shifted with respect to the optical axis of the projection lens, the center position of the image formation area on the light modulation element is changed while performing the electronic zooming based on a shift position of the projection lens relative to the light modulation element.

* * * * *